(No Model.)
J. S. HETHERINGTON.
POWER STAND.
No. 335,128. Patented Feb. 2, 1886.
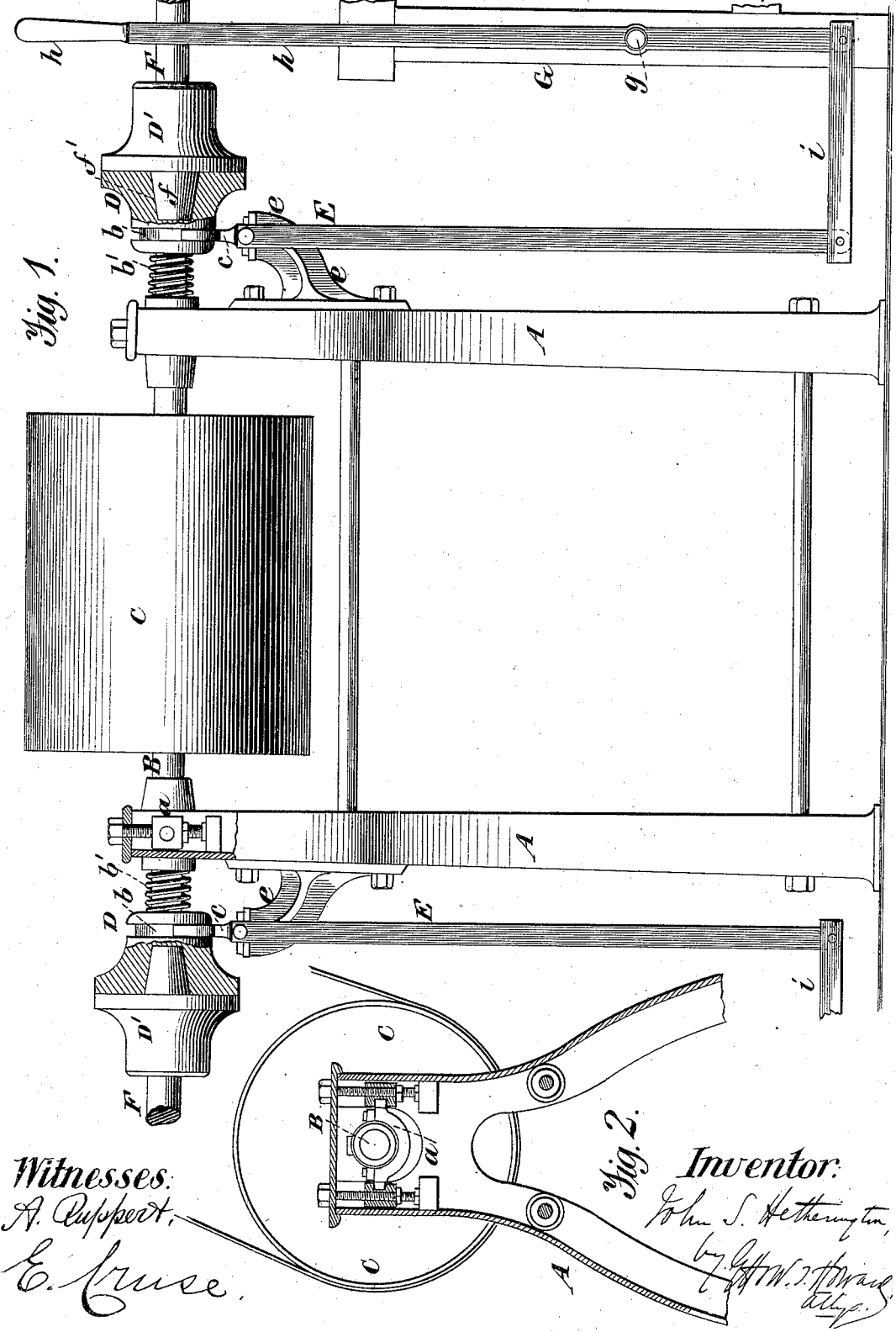
Witnesses.
A. Ruppert,
E. Cruse.
Inventor:
John S. Hetherington,
by Geo. W. S. Howard
Atty.

UNITED STATES PATENT OFFICE.

JOHN S. HETHERINGTON, OF DALLAS, TEXAS.

POWER-STAND.

SPECIFICATION forming part of Letters Patent No. 335,128, dated February 2, 1886.

Application filed May 20, 1885. Serial No. 166,134. (No model.)

*To all whom it may concern:*

Be it known that I, JOHN S. HETHERINGTON, of Dallas, in the county of Dallas and State of Texas, have invented certain new and useful Improvements in Power-Stands for Various Uses, of which the following is a specification, reference being had to the accompanying drawings, and to the letters of reference marked thereon, in which—

Figure 1 is an elevation, partly in section; and Fig. 2, an end view of a detail of my invention.

In this invention a single pulley is mounted upon a stand, the shaft of said pulley bearing at each end, outside of the stand, one part of a friction or other clutch, which may be engaged with or disengaged from the corresponding part of a clutch attached to the shaft of a machine.

The stand is placed between two machines, and either or both may at pleasure be connected with or disconnected from the revolving shaft of the driving-pulley.

My improved power-stand may be placed between two cotton-gins, or a saw-mill and a planing-mill, or in any other way in which such a device would be useful.

One principal object of the invention is to provide for the stopping of either machine without the necessity of throwing off the belt or stopping the engine.

The invention is specially adapted to cotton-gins made right and left—that is to say, where the belt of one gin is on the right-hand side, and the belt of the other machine on the left.

Heretofore it has often happened that the operator, desiring to remove an obstruction from the gin, has, rather than stop the entire power, inserted his arm, and in consequence loss of limb and life has been a common occurrence.

In my invention the cotton-gins or other machines are placed entirely under the control of the operator, and the machines themselves may be simplified by the omission of certain parts.

In the accompanying drawings, A is the power-stand, having vertically-adjustable bearings $a$, in which a power-shaft, B, carrying a pulley, C, is supported. The shaft B is made vertically adjustable to adapt the power-shaft to the height of the shafts to which it is to be connected. Each end of the shaft B, outside of the power-stand A, is provided with a sliding portion, D, of a friction-clutch, each part D having a groove, $b$, within which fits the shifter $c$, whose lever E has its fulcrum in the bracket $e$.

F F represent the shafts of the machines to which power is to be transmitted. The end of each shaft F carries a part, D', of the clutch. The clutch here shown is of the friction type, connection between the two parts being made by means of a conical tongue, $f$, which fits within the conical socket $f'$ of the part D of the clutch.

The frames of the machines are shown by G G, and to these frames the shifter-levers $h$ are pivoted at $g$, a connection being made to the clutch-levers by the bars $i$.

In operation power may be transmitted to either or both machines by placing one or both of the clutches D D' in gear. The adjustable bearings $a$ allow the power-shaft B to be accurately adjusted to the height of the machines.

It will be seen that by this invention the advantageous results hereinbefore enumerated are produced, and that the dangers mentioned are removed, both machines being placed under the control of the operator, who may run or stop one or both without stopping the rotation of the driving-pulley of the power-shaft or shifting or throwing off the belt.

Having described my invention, I claim—

The combination, with two machines, each having a shaft and one-half of a clutch at the end of said shaft, of a power-stand placed between said machines, having a power-shaft, a pulley, and a half-clutch at each end of the shaft outside of the stand, and shifting devices, whereby the parts of the clutches may be engaged or disengaged, substantially as set forth.

In testimony whereof I hereunto set my hand and seal.

JNO. S. HETHERINGTON. [L. S.]

Witnesses:
A. WISHART,
THEO. MOSHER.